No. 750,511. PATENTED JAN. 26, 1904.
W. H. WHERRY.
PROCESS OF UNITING TWO METALS.
APPLICATION FILED APR. 6, 1903.
NO MODEL.
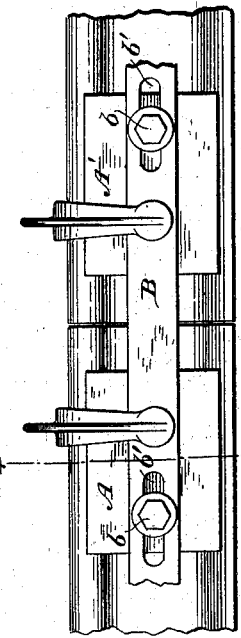
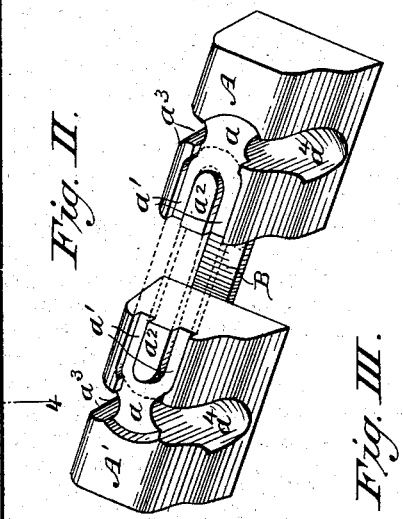
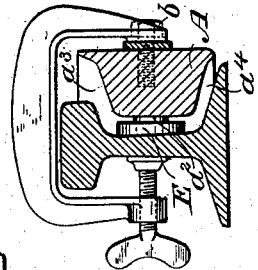
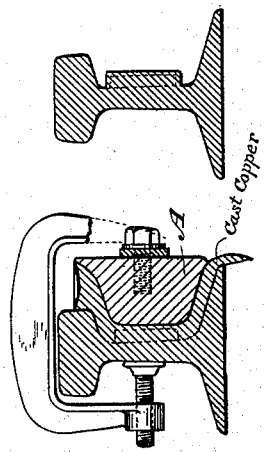
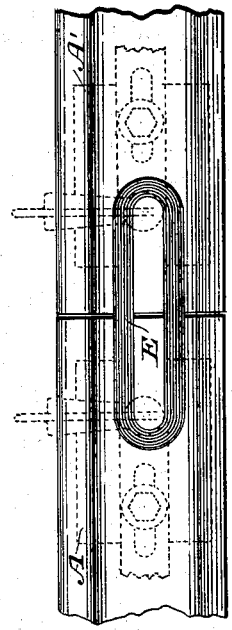
WITNESSES:
L. T. Davies
G. W. Saywell
INVENTOR:
William H. Wherry
by his attorney
J. B. Fay No. 750,511. Patented January 26, 1904.

UNITED STATES PATENT OFFICE.

WILLIAM H. WHERRY, OF CLEVELAND, OHIO.

PROCESS OF UNITING TWO METALS.

SPECIFICATION forming part of Letters Patent No. 750,511, dated January 26, 1904.

Application filed April 6, 1903. Serial No. 151,258. (No specimens.)

*To all whom it may concern:*

Be it known that I, WILLIAM H. WHERRY, a citizen of the United States, and a resident of Cleveland, county of Cuyahoga, and State of Ohio, have invented a new and useful Improvement in Processes of Uniting Two Metals, of which the following is a specification, the principle of the invention being herein explained and the best mode in which I have contemplated applying that principle, so as to distinguish it from other inventions.

My improved process relates to uniting two metals by casting one metal upon the other, its object being to effect such union in a manner more economical and efficacious than is possible by the processes heretofore used.

Said invention consists of steps hereinafter fully described, and specifically set forth in the claims.

In my said process I mix with one of the metals when molten a flux that has the following characteristics: It combines chemically with both of the metals, lowers the fusing-point, and increases the fluidity of both metals, cleans the surfaces of both metals, and thereby admits of more perfect contact between them by dissolving the oxids of both metals and reducing them to the metallic condition, and when volatilized removes oxygen from the contact-surfaces, both by removing the air mechanically and by combining chemically with the oxygen of the air.

Instead of mixing the flux with the molten metal I may prepare the other metal when cold for the union by treating it with the flux before the molten metal is poured upon it, or I may treat both the molten metal and the cold metal with the flux, or, preferably, I may treat the molten metal alone with the flux and then cast the mixture of molten metal and flux upon the other cold metal.

The flux that I prefer as most efficient and economical is phosphorus, which is mixed with the molten metal in the proportions of approximately three ounces of the phosphorus to eighty pounds of the molten metal, or when used for preparing the cold metal for the union is used either alone or mixed with enough acid (muriatic acid preferred) to make it pasty, whereby it is applied much more conveniently to the cold metal, the acid having a cleansing as well as a binding action upon the metal. In case it is desired to secure a definite line of demarcation between the two metals or to cast the molten metal upon a definite area of the cold metal refractory material may be used in the well-known manner for utilizing non-fusible substances to cover those exposed parts of the cold metal which should be protected from the molten metal. A mold can be fitted over the cold metal where it is desired to cast the molten metal, such mold having proper sprues to allow of the entrance and escape of molten metal, which is preferably allowed to run through the mold until the cold metal becomes heated, softer, and more porous, and an intimate and permanent union is obtained between the two metals when the desired quantity of molten metal is retained upon the cold metal and allowed to cool. The molten metal that escapes from the mold can be reheated and again used. The length of time that the molten metal should be allowed to run and the amount of it allowed to run through the mold depend upon the metals which it is desired to unite. It may often be found advisable to heat and soften the cold metal by means other than that of letting the molten metal run for a sufficient time to accomplish this purpose, such as a hot blast or any other well-known method of heating a metal. The mechanical devices for first cleansing the surface of the cold metal by emery or other means and also for nicking it with a hard tool will both be found serviceable in obtaining a more intimate contact of the metals.

Although my improved process can be used upon many occasions where it is desired to cast one metal upon another, it will be found peculiarly applicable in casting rail-bonds integral with steel rails, in which use the flux is mixed with molten copper in the proportions above stated, and also it is found expedient to treat the ends of a copper wire that is to serve as an electrical connector between two rails with the flux and then cover the rails with the refractory material, fit the molds over the rails, and pour the molten copper and flux to cast the terminals of the bond upon the rails, all as has been mentioned above in the description of the general application of my improved process. By "copper" wire I mean a single wire, a flexible strand, a plurality of flexible flat or round wires, or any other shape or number of connectors that may be used to electrically unite two rails. By "steel" I mean all kinds of iron. In this special application of my process the flux should be applied to the extreme ends of the copper wire in such quantity as to slightly coat the two ends with the flux for about a quarter of an inch, and care should be employed that the flux be not allowed to flow farther down the wire, since it would combine chemically with the copper wire and form a compound that is very brittle, and hence more easily broken than is the pure copper.

The ease with which my process may be applied, its economy, and the certainty and intimacy of the union obtained between the two metals renders it much improved over those heretofore used in uniting copper with steel.

I shall now describe in detail one form of apparatus for carrying out my above-described process, as well as the process itself, as particularly applied to the formation of rail-bonds integral with the abutting ends of two rails.

The annexed drawings and the following description set forth in detail certain means for carrying out the invention, such disclosed means constituting but one of various forms in which the principle of the invention may be applied.

In said annexed drawings, Figure I represents a side elevation of two abutting rail ends, showing the mold for casting the bond-terminals upon the rails secured thereon. Fig. II represents a perspective view of said mold. Fig. III represents a side elevation of said rail ends, showing a bond-loop in position thereon ready for union with the rails, the mold being shown in dotted lines in proper position for casting. Fig. IV represents a vertical transverse section taken upon the plane represented by line 4 4 in Fig. I. Fig. V represents a similar section showing the mold filled with copper united with the rail. Fig. VI represents a similar section with the mold removed and showing the bond-terminal trimmed. Fig. VII represents a side elevation of the rail ends and the completed and finished bond.

The mold illustrated consists of two duplicate cast-iron parts A and A', joined by a bar B, secured to such parts by means of screws $b\, b$, passing through elongated slots $b'\, b'$, whereby the distance between the molds may, as will be readily understood, be changed or adjusted to correspond with different lengths of bonds. Each such mold part is formed to snugly fit between the under surface of the rail-tread and the upper surface of the rail-flange, as shown in Figs. IV and V, and against the web. The inner surface thereof is provided with a terminal recess $a$ and loop-recess $a'$, the latter in the particular form illustrated being divided by a projection $a^2$. Recess $a'$ is adapted to receive the end of the bond-loop which snugly fits therein, so as to prevent metal from flowing therethrough, such recess being of a depth equal to the thickness of the loop. The outer end of projection $a^2$ is rounded to fit the interior curved surface of such loop. A loop located in the mold is shown in dotted lines in Fig. II, whereby it is seen the loop projects a short distance into recess $a$. Communicating at the top and bottom, respectively, with each recess $a$ are two sprues $a^3$ and $a^4$, the sprue $a^3$ being somewhat enlarged at its outer end to facilitate the pouring of the copper therein. The recess $a$ is made slightly deeper than recess $a'$. Before applying such described mold to the rails the interior surfaces of the recesses and sprues are covered with a material which will prevent the union or sticking of the copper to the mold. A suitable substance for this purpose is clay mixed in liquid form, commonly called "clay-wash." A loop E is now laid in the mold, as indicated in said Fig. II, and the exposed surfaces of the ends thereof brushed with flux. That part of the surface of the rail-web upon which the terminals are to be cast—that is, the surface immediately behind the recess $a$ when the mold is in place—is now prepared as above described and may also be treated with flux. The mold is now placed in position against the rail ends and securely clamped thereto by any suitable means. Copper is now poured through sprue $a^3$ into recess $a$, from whence it flows out of sprue $a^4$. After such flowing of copper has sufficiently heated the rail-web it is stopped by plugging up the lower end of sprue $a^4$, and the retained copper is allowed to set. After setting the mold is removed. The copper terminals formed by recess $a$ will now be found to be intimately united with the rail and copper bond-loop, as shown in Fig. V. The superfluous metal above and below the terminal is now cut off, leaving the bond completed and trimmed, as shown in Figs. VI and VII.

Other modes of applying the principle of my invention may be employed instead of the one explained, change being made as regards the process herein disclosed, provided the means stated by any one of the following claims or the equivalent of such stated means be employed.

I therefore particularly point out and distinctly claim as my invention—

1. A process of uniting two metals, consisting of: applying to one of such metals a flux that will combine chemically with both the metals, adding to the other metal in a molten condition approximately one-fifth per cent. of phosphorus, and then pouring such molten metal and phosphorus upon the other treated metal.

2. A process of uniting two metals, consisting of: applying to one of such metals a flux that will combine chemically with both metals and that will lower the fusing-points of both metals, adding to the other metal in a molten condition approximately one-fifth per cent. of phosphorus, and then pouring such molten metal and phosphorus upon the other treated metal.

3. A process of uniting two metals, consisting of: applying to one of such metals a flux that will combine chemically with both the metals, and that will lower the fusing-points and increase the fluidity of both metals, adding to the other metal in a molten condition approximately one-fifth per cent. of phosphorus, and then pouring such metal and phosphorus upon the other treated metal.

4. A process of uniting two metals, consisting of: applying to one of such metals a flux consisting of phosphorus, adding to the other metal in a molten condition approximately one-fifth per cent. of phosphorus, and then pouring such molten metal and phosphorus upon the other treated metal.

5. A process of uniting two metals, consisting of: applying to one of such metals a flux consisting of phosphorus mixed with an acid, adding to the other metal in a molten condition approximately one-fifth per cent. of phosphorus, and then pouring such molten metal and phosphorus upon the other treated metal.

6. A process of uniting two metals, consisting of: applying to one of such metals a flux consisting of phosphorus mixed with muriatic acid, adding to the other metal in a molten condition approximately one-fifth per cent. of phosphorus, and then pouring such molten metal and phosphorus upon the other treated metal.

7. A process of uniting copper with steel, consisting of: applying to such steel a flux that will combine chemically with both the steel and the copper, adding to molten copper approximately one-fifth per cent. of phosphorus, and then pouring such molten copper and phosphorus upon the steel.

8. A process of uniting copper with steel, consisting of: applying to such steel a flux that will combine chemically with both the steel and the copper, and that will lower the fusing-points and increase the fluidity of both metals, adding to molten copper approximately one-fifth per cent. of phosphorus, and then pouring such molten copper and phosphorus upon the steel.

9. A process of uniting copper with steel, consisting of: applying to such steel a flux consisting of phosphorus, adding to molten copper approximately one-fifth per cent. of phosphorus, and then pouring such molten copper and phosphorus upon the steel.

10. A process of uniting copper with steel, consisting of: applying to such steel a flux consisting of phosphorus mixed with an acid, adding to molten copper approximately one-fifth per cent. of phosphorus, and then pouring such molten copper and phosphorus upon the steel.

11. A process of uniting copper with steel, consisting of: applying to such steel a flux consisting of phosphorus mixed with muriatic acid, adding to molten copper approximately one-fifth per cent. of phosphorus, and then pouring such molten copper and phosphorus upon the steel.

12. A process of uniting two metals, consisting of: cleaning the surface of one metal by means of emery or other mechanical device, nicking the surface of such metal, applying to such metal a flux consisting of phosphorus mixed with muriatic acid, adding to the other metal in a molten condition approximately one-fifth per cent. of phosphorus, spreading refractory material over those exposed parts of the cold metal which should be protected from molten metal, fitting a mold over the metal which has proper sprues to allow of the entrance and escape of molten metal, and pouring the molten metal and phosphorus into the mold and upon the cold metal, until the latter is sufficiently heated to allow of the intimate and permanent union of the two metals, allowing the metals to cool and then removing the molds.

13. A process of uniting two metals, consisting of: cleaning the surface of one of the metals by means of emery or other mechanical device, nicking the surface of such metal, applying to such metal a flux consisting of phosphorus mixed with muriatic acid, adding to the other metal in a molten condition approximately one-fifth per cent. of phosphorus, spreading refractory material over those exposed parts of the cold metal which should be protected from molten metal, fitting a mold over the metal which has proper sprues to allow of the entrance and escape of molten metal, heating the cold metal by a blast or other means until it is sufficiently heated to form an intimate and permanent union with the molten metal and phosphorus, and then pouring any desired amount of such molten metal and phosphorus into the mold and upon the other metal, allowing the metals to cool and removing the molds.

14. A process of uniting copper with steel, consisting of: cleaning the surface of such steel by means of emery or other mechanical device, nicking the surface of such steel, applying to such steel a flux consisting of phosphorus mixed with muriatic acid, adding to molten copper approximately one-fifth per cent. of phosphorus, spreading refractory material over those exposed parts of the steel which should be protected from molten metal, fitting a mold over the steel which has proper sprues to allow of the entrance and escape of molten metal, and pouring the molten copper and phosphorus into the mold and upon the steel, until the latter is sufficiently heated to allow of the intimate and permanent union of the steel and the copper, allowing the steel and the cast copper to cool and then removing the molds.

15. A process of uniting copper with steel, consisting of: cleaning the surface of such steel by means of emery or other mechanical device, nicking the surface of such steel, applying to such steel a flux consisting of phosphorus mixed with muriatic acid, adding to molten copper approximately one-fifth per cent. of phosphorus, spreading refractory material over those exposed parts of the steel which should be protected from molten metal, fitting a mold over the steel which has proper sprues to allow of the entrance and escape of molten metal, heating the steel by a blast or other means until it is sufficiently heated to form an intimate and permanent union with the molten copper and phosphorus and then pouring any desired amount of such copper and phosphorus into the mold and upon the steel, allowing the metals to cool and removing the molds.

16. A process of casting a rail-bond integral with steel rails, consisting of: applying to the ends of a length of copper wire, intended to form the electrical connector between two rails, a flux that will combine chemically with both the steel and the copper, placing such length of copper wire in a mold that has proper sprues to allow of the entrance and escape of molten metal, applying the mold to the rails, and then pouring molten metal upon the ends of the length of copper wire, to form the terminals of the bond.

17. A process of casting a rail-bond integral with steel rails, consisting of: applying to the ends of a length of copper wire, intended to form the electrical connector between two steel rails, a flux that will combine chemically with both the steel and the copper and that will lower the fusing-points of both metals, placing such length of copper wire in a mold that has proper sprues to allow of the entrance and escape of molten metal, applying the mold to the rails, and then pouring molten metal upon the ends of such length of copper wire, to form the terminals of the bond.

18. A process of casting a rail-bond integral with rails, consisting of: applying to the ends of a length of copper wire, intended to form the electrical connector between two rails, a flux consisting of phosphorus, placing such length of copper wire in a mold that has proper sprues to allow of the entrance and escape of molten metal, applying the mold to the rails, and then pouring molten metal upon the ends of the length of copper wire, to form the terminals of the bond.

19. A process of casting a rail-bond integral with rails, consisting of: applying to the ends of a length of copper wire, intended to form the electrical connector between two rails, a flux consisting of phosphorus mixed with muriatic acid, placing such length of copper wire in a mold that has proper sprues to allow of the entrance and escape of molten metal, applying the mold to the rails, and then pouring molten copper upon the ends of such length of copper wire, to form the terminals of the bond.

20. A process of casting a rail-bond integral with rails, consisting of: applying to the ends of a length of copper wire, intended to form the electrical connector between two rails, a flux consisting of phosphorus mixed with muriatic acid, placing such length of copper wire in a mold that has proper sprues to allow of the entrance and escape of molten metal, applying the molds to the rails, adding to molten copper approximately one-fifth per cent. of phosphorus, and then pouring such molten copper and phosphorus upon the ends of such length of copper wire, to form the terminals of the bond.

21. A process of casting a rail-bond integral with rails, consisting of: cleaning the surfaces of such rails by means of emery or other means, nicking the surfaces of such rails, applying to the ends of a length of copper wire, intended to form the electrical connector between two rails, a flux consisting of phosphorus mixed with muriatic acid, spreading refractory material over those exposed parts of the rails which should be protected from molten metal, placing the length of copper wire in a mold that has proper sprues to allow of the entrance and escape of molten metal, applying the mold to the rails, adding to molten copper approximately one-fifth per cent. of phosphorus, pouring the molten copper and phosphorus into the mold and upon the ends of such length of copper wire, to form the terminals of the bond, until the rails are sufficiently heated to allow of the intimate and permanent union of the bond-terminals thus cast and the rails, and then allowing the rails and cast terminals to cool, and removing the mold.

22. A process of casting a rail-bond integral with rails, consisting of: cleaning the surfaces of such rails by means of emery or other means, nicking the surfaces of such rails, applying to the ends of a length of copper wire, intended to form the electrical connector between two rails, a flux consisting of phosphorus mixed with muriatic acid, spreading refractory material over those exposed parts of the rails which should be protected from molten metal, placing the length of copper wire in a mold that has proper sprues to allow of the entrance and escape of molten metal, applying the mold to the rails, adding to molten copper approximately one-fifth per cent. of phosphorus, heating the rails hot until they are sufficiently heated to form an intimate and permanent union with the molten copper and phosphorus, pouring such molten copper and phosphorus into the mold, and upon the ends of the length of copper wire, to form the terminals of the bond, and then allowing the rails and the cast terminals to cool and removing the mold.

Signed by me this 3d day of April, 1903.

WILLIAM H. WHERRY.

Attest:
D. T. DAVIES,
G. W. SAYWELL.